US008787576B2

(12) United States Patent  
Whelan et al.

(10) Patent No.: US 8,787,576 B2  
(45) Date of Patent: Jul. 22, 2014

(54) SYSTEM AND METHOD FOR DETECTING UNAUTHORIZED WIRELESS ACCESS POINTS

(75) Inventors: Robert Whelan, Kirkland, WA (US); Lamar Van Wagenen, Sandy, UT (US); Roy Morris, Bothell, WA (US)

(73) Assignee: Crimson Corporation, Dover, DE (US)

( * ) Notice: Subject to any disclaimer, the term of this patent is extended or adjusted under 35 U.S.C. 154(b) by 0 days.

(21) Appl. No.: 13/164,459

(22) Filed: Jun. 20, 2011

(65) Prior Publication Data

US 2011/0314147 A1 Dec. 22, 2011

Related U.S. Application Data (63) Continuation of application No. 10/184,750, filed on Jun. 28, 2002, now Pat. No. 7,965,842.

(51) Int. Cl.  
*H04L 29/06* (2006.01)

(52) U.S. Cl.  
USPC .......................................................... 380/270

(58) Field of Classification Search  
USPC ............................................ 380/270; 38/270  
See application file for complete search history.

(56) References Cited

U.S. PATENT DOCUMENTS

| 6,754,488 | B1* | 6/2004 | Won et al. ..................... 455/424 |
| 7,181,530 | B1* | 2/2007 | Halasz et al. ................. 709/238 |
| 2002/0075844 | A1* | 6/2002 | Hagen ............................ 370/351 |
| 2002/0157090 | A1* | 10/2002 | Anton, Jr. ....................... 717/178 |
| 2003/0217289 | A1* | 11/2003 | Ammon et al. ................. 713/201 |
| 2003/0219008 | A1* | 11/2003 | Hrastar .......................... 370/352 |
| 2003/0232598 | A1* | 12/2003 | Aljadeff et al. ............... 455/41.2 |

* cited by examiner

Primary Examiner — Jason Gee  
(74) Attorney, Agent, or Firm — Austin Rapp & Hardman (57) ABSTRACT

Unauthorized wireless access points are detected by configuring authorized access points and mobile units to listen to all wireless traffic in its cell and report all detected wireless devices to a monitor. The monitor checks the reported devices against a list of authorized network devices. If the reported wireless device is not an authorized device, the monitor determines if the reported device is connected to the network. If the reported device is connected to the network and is not an authorized device, the monitor alerts the network operator or network manager of a rogue device connected to the network and attempts to locate and isolate the rogue device.

14 Claims, 5 Drawing Sheets

SYSTEM AND METHOD FOR DETECTING UNAUTHORIZED WIRELESS ACCESS POINTS

The present application is a Continuation of U.S. patent application Ser. No. 10/184,750, filed Jun. 28, 2002, now U.S. Pat. No. 7,965,842, issued Jun. 21, 2011, which application is incorporated herein by reference in its entirety.

FIELD OF THE INVENTION

The present invention relates to the field of communication/computer networks. Specifically, the present invention relates to increasing security of wireless networks.

BACKGROUND OF THE INVENTION

Citation or identification of any reference in this Section or any section of this Application shall not be construed to mean that such reference is prior art to the present invention.

A Wireless Local Area Network (WLAN) enables network devices to communicate with each other wirelessly, typically by radio. A WLAN typically includes a wired portion and a wireless portion. The wired portion is typically connected (for example, via a router and/or firewall) to a larger network, such as a business wide-area network, and/or the Internet.

The wireless portion of a WLAN typically includes at least one access point and at least one mobile unit. An access point is a wireless device that provides WLAN connectivity to mobile units. An access point is typically physically connected to the wired portion of the WLAN and capable of transmitting and receiving communications between a wired portion of the WLAN and a wireless portion of the WLAN. However, some access points are configured as repeaters, and lack a physical connection to a wired portion of the WLAN, instead connecting to the WLAN via another access point. As used here, a mobile unit is a wireless device (whether actually mobile or not) capable of communicating wirelessly with an access point or other device on a WLAN, and which is at least part of the time not physically wired to the wired portion of the WLAN. Mobile units generally do not provide WLAN connectivity to other mobile units. Each access point is capable of communicating with wireless devices within its cell (operating range). The set of mobile units within an access point's cell and the access point is usually referred to as the Basic Service Set (BSS). If a second access point connected to the wired portion of the WLAN is within the cell of the first access point, the BSS of the first access point will overlap with the BSS of the second access point. Typically each access point in this arrangement will be capable of detecting the other access point, and mobile units may move from the first cell to the second cell without breaking communication with the network. A set of network devices, including at least two access points, capable of wired and/or wireless communications with each other is usually referred to as the Extended Service Set (ESS).

Interoperability between access points and mobile units from different manufacturers is enabled by designing each access point and mobile unit to a common standard such as IEEE 802.11. The IEEE 802.11 standards define a common set of services that roughly corresponds to OSI layers 1 (physical) and 2 (data link). Widespread adoption of the 802.11 standard has resulted in the rapid growth of WLAN implementations.

The ability to access network resources without a physical connection to the network increases the security risks to the network because controlling physical access to all mobile units capable of communicating with access points in a WLAN is generally difficult or impossible. Furthermore, the wireless portion of the WLAN is typically based on radio signals that may be received by any device capable of receiving and/or transmitting such a signal.

Network security administrators have recognized the potential security risks of attaching access points to their LANs and usually implement basic procedures to ensure network security such as maintaining a database of authorized devices connected to the LAN such as an Access Control List (ACL). The ACL is commonly implemented as an electronic data structure maintained by an enterprise network manager executing on the wired portion of the network.

The administrator's job is further complicated by the low cost and relative ease of installing an access point for a local work group. Many access points (e.g. 802.11 access points) use a simple bridging protocol and can be added to a compatible wired network without any centralized control or action. Moreover, many inexpensive access points are very difficult to detect once installed. Many local work groups install an access point onto the existing company network, not appreciating the increased risk to the entire network created by the newly attached rogue access point, without bothering to inform the network administrator of the rogue access point. Moreover, the rogue access point is often configured using settings such as factory default settings that do not conform to the security settings of the authorized network devices and therefore represents a serious security risk to the entire network.

Network administrators usually have at least one network management utility that is capable of discovering most of the network devices attached to the network. Almost all such utilities, however, require either a query/response between the management agent and the network device or an agent executing on the network device and reporting to the management agent. Many inexpensive access points, however, are not configured to respond to standard management queries and are therefore very difficult to detect.

Therefore, there exists a need for the detection of unauthorized rogue access points connected to a network.

SUMMARY OF THE INVENTION

In one aspect, the invention comprises a system for detecting unauthorized wireless access points, the system further comprising: a database of authorized wireless access points; and a server configured to receive a message from a wireless device, the message indicating the existence of a wireless access point, the server being further configured to query the database to determine whether the wireless access point is authorized.

In another aspect, the invention comprises a system for detecting unauthorized wireless access points, the system further comprising: one or more electronic data structures comprising data representing one or more mobile wireless devices operatively associated with one or more authorized wireless access points; a network monitor configured to detect on a wired network a message originating from a mobile wireless device; the network monitor being further configured to query the one or more data structures to determine whether the message originated from a mobile wireless device associated with an authorized wireless access point.

In still another aspect, the invention comprises a system for detecting unauthorized wireless mobile units, including: one or more electronic data structures representing one or more mobile wireless devices operatively associated with one or more authorized wireless access points; and a network monitor configured to detect on a wired network a message originating from a mobile wireless device, the network monitor being further configured to query the one or more data structures to determine whether the message originated from a wireless device associated with an authorized wireless access point.

In yet another aspect, the invention comprises a system for detecting unauthorized wireless access points, the system comprising: a network segment for which no wireless access point is authorized: and a network monitor configured to detect on the network segment a message originating from a wireless device.

In another aspect, the invention comprises a system for detecting unauthorized access points the system comprising: a wired network segment enabling communication between a first network device and a second network device via at least one wire; an access point electrically connected to the wired network segment configured to communicate via wireless electromagnetic signals with one or more mobile wireless devices when the one or more mobile wireless devices are within a communication zone of the access point; and a network monitor configured to receive from the access point a list of all mobile wireless devices within the communication zone of the access point and to determine the presence of an unauthorized device electrically connected to the wired network based on the list of wireless devices received from the access point.

In another aspect, the invention comprises a method for detecting an unauthorized wireless device on a WLAN comprising the steps of: detecting the presence of an unknown wireless device within a cell of a wireless device known to the WLAN; monitoring WLAN traffic for a message from the unknown wireless device; and classifying the unknown wireless device as an unauthorized wireless device if the monitored traffic includes a message from the unknown wireless device.

In another aspect, the invention comprises a system for securing a network, comprising: a network monitor configured to monitor a network for unauthorized access points; the network monitor being further configured to attempt to disable wireless communications via an unauthorized access point. In one embodiment, the unauthorized access point comprises a MAC address filter for prohibiting access to the access point based on information describing one or more MAC addresses; and the network monitor is further configured to set the MAC address filter of the unauthorized access point to prohibit access by any wireless device to the access point. In another embodiment, the system further comprises a switch or router configured to transfer information between at least two network segments; and the network monitor is further configured to configure the switch or router to prevent transfer of information through the switch originating from or addressed to the unauthorized access point.

In another aspect, the invention comprises a wireless security system, comprising: a wired network segment enabling communication between a first network device and a second network device via at least one wire; at least one access point electrically connected to the wired network segment configured to communicate via wireless electromagnetic signals with one or more mobile wireless devices when the one or more mobile wireless devices are within a communication zone of the access point; and a network monitor configured to disable wireless communication with the at least one access point according to a regular business schedule.

BRIEF DESCRIPTION OF THE FIGURES

The present invention may be understood more fully by reference to the following detailed description of the preferred embodiment of the present invention, illustrative examples of specific embodiments of the invention and the appended figures in which.

DETAILED DESCRIPTION OF THE PREFERRED EMBODIMENT

In one aspect, the present invention comprises a method and system for detecting unauthorized wireless access points, comprising at least one network monitor and one or more wireless receivers, the wireless receivers being configured to report wireless device identification information to the network monitor, and the network monitor being configured to determine whether the reported wireless devices are connected to the network and if so, whether the connection is via a known or authorized access point. Preferably, the network monitor queries and/or maintains a database of known and/or authorized wireless devices, preferably known and/or authorized access points.

Authorized wireless devices are wireless devices that are authorized to be connected to a wired portion of the monitored network. Known wireless devices are devices that have been detected, whether or not they are connected to a wired portion of the monitored network, and may include, for example, wireless devices in use in a neighboring location that are not connected to the monitored network. Rogue access points are access points that are connected to a wired portion of the monitored network but not authorized to be connected to the wired portion of the network.

In one embodiment, the network monitor preferably determines whether reported devices are connected to the wired network by monitoring the network for packets including wireless device identification information reported by one or more wireless receivers. In a preferred 802.11 embodiment, the wireless device identification information comprises a Medium Access Control (MAC) address of the reported wireless device. By monitoring the network for the MAC address reported by the wireless receiver, the network monitor can determine if traffic from the reported wireless device is being carried by the monitored network.

When an unknown access point is detected, the network monitor preferably attempts to identify the unknown access point on the network, and to isolate the unknown access point.

In one preferred embodiment, the wireless receivers comprise authorized mobile units, which are used to listen for unknown access points and/or mobile units. Conventionally, a mobile unit is programmed to process only transmissions directed to the mobile unit. In one embodiment of the present invention, however, a mobile agent is installed on a plurality of the network's authorized mobile units and configured to process all transmissions detected by the each mobile unit on which the mobile agent executes. Preferably, the mobile agent executes even when the mobile units are not associated with an access point. The mobile agents preferably report on access point/mobile unit traffic information to the network monitor, or store traffic information for later reporting to the monitor. Reporting may be initiated by a mobile unit, or by the network monitor.

In one preferred embodiment, at least one mobile unit is capable of determining its location, via GPS for example, and includes this information in its report to the monitor. By reporting on wireless traffic, the mobile agents have a greater likelihood of detecting unknown access points or mobile units that may represent a security threat to the network. Preferably, reporting mobile units also include information identifying the access point with which the reported mobile unit is communicating, such as the BSSID of the access point, and the IP address used by the mobile unit, if any.

Figure 1:
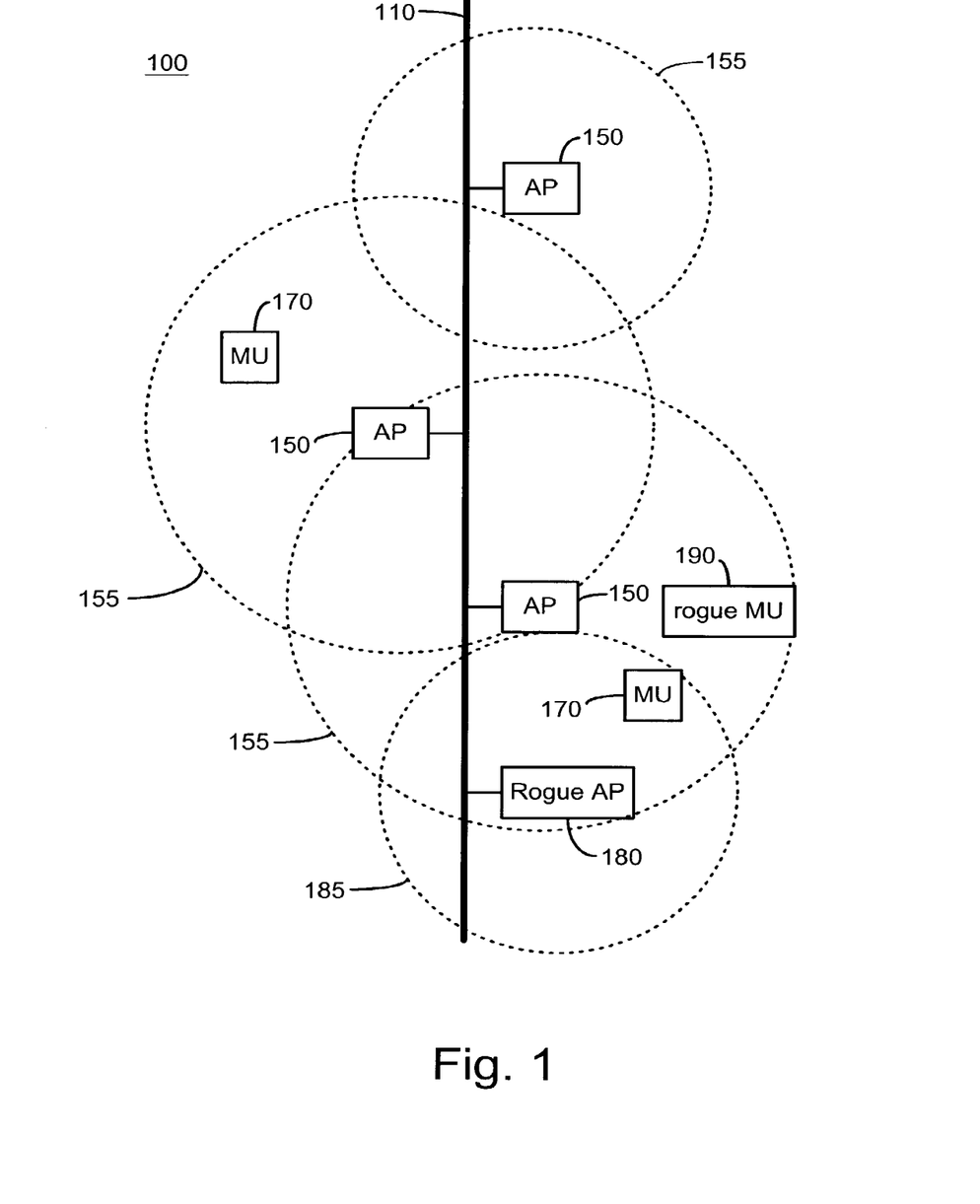
FIG. 1 is a schematic diagram of a portion of a wireless network in one embodiment of the present invention.

In another embodiment of the present invention, an access point agent is installed on authorized access points in the network and continuously listens to the wireless traffic within the cell of the access point on which it is installed. Unlike conventional access points that only report mobile units that successfully associate with the access point or fail to associate for various reasons such as for example not being a member of an Access Control List (ACL), the access point agent is configured to report or store for later retrieval all wireless devices heard by the access point FIG. 1 is a schematic diagram of a portion of an example wireless network. Example WLAN 100 includes a wired portion 110 of the network comprising network devices physically connected to the network by wires (such as metal cables or optical wires). Example WLAN 100 includes at least one authorized access point 150 and at least one mobile unit 170. The access point 150 is connected to the wired portion 110 of the network and is capable of communicating wirelessly with a mobile unit 170 within the access point's cell 155. Access point 150 is typically configured to function as a bridge between the wireless and wired portions of the WLAN, allowing the mobile unit 170 to communicate with any network-connected device in the network 100. An unauthorized, rogue access point 180 may also be physically connected to the wired portion 110 of the network. An unauthorized rogue mobile unit 190 within an authorized cell 155 may be capable of accessing the network 100 through the authorized access point 150. If rogue mobile unit 190 moves within the cell 185 of rogue access point 180, rogue mobile unit 190 may also be able to access the network 100 via rogue access point 180.

Before a mobile unit can communicate with other network devices on the network, the mobile unit must first join the network. In an 802.11 WLAN, the mobile unit may passively scan each communication channel for a beacon frame transmitted from the access point. The beacon frame provides a time synchronization signal for all mobile units associated with the access point and includes the access point's Basic Service Set Identification (BSSID). The BSSID is a unique identifier for each access point on the network. Most manufacturers of access points use the access point's MAC address as its BSSID. If a mobile unit is within the access point's cell when the beacon frame is broadcast, the mobile unit may establish a connection with the access point by transmitting a probe request frame. Any rogue mobile unit within the access point's cell, however, will also hear the beacon frame and may try to access the network through the access point. Therefore, the access point may be configured to operate silently, suppressing the transmission of the BSSID and only listening for probe request frames from mobile units within the access point's cell. If the access point is configured to operate silently, the access point will listen to all probe requests broadcast in its cell, check the destination address of the request, and complete the reception of the frame if the destination address matches the address of the access point. The access point transmits a probe response to the mobile unit containing information necessary to establish communication with the access point.

Once the 802.11 mobile unit discovers an access point, the mobile unit transmits an association request frame to the access point to become associated with the access point. The access point transmits an association response frame to the mobile unit accepting or rejecting the association. If the association is accepted, the access point assigns an association ID to the association.

In one preferred embodiment, wireless devices such as mobile unit 170 are used to discover access points such as rogue access point 180 by transmitting probe requests and reporting all probe responses to a network monitor. Preferably, the network monitor is an agent executing on a machine connected to the wired portion of the network. The network monitor preferably maintains information identifying known access points and authorized access points, and optionally known mobile units.

Figure 2:
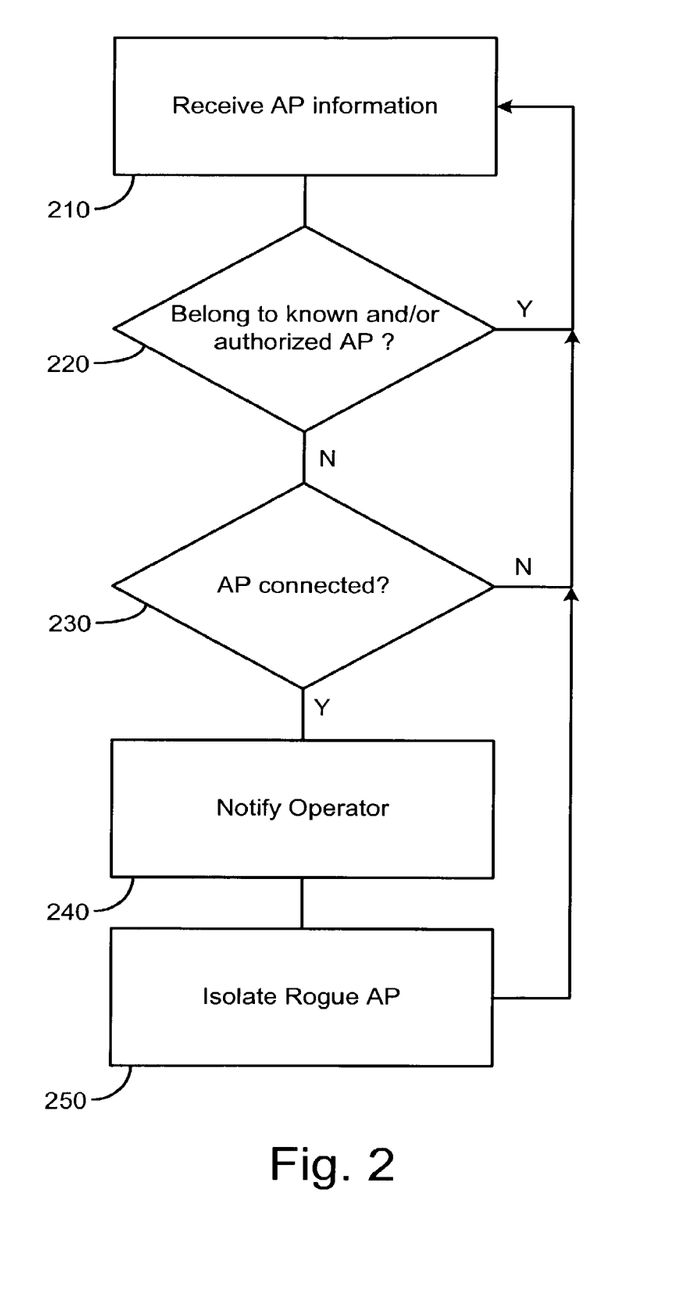
FIG. 2 is a flowchart of one embodiment of the present invention.

FIG. 2 is a flowchart of one embodiment of the present invention. The network monitor receives access point identification information from a wireless receiver in step 210. The access point identification may be the BSSID of the access point (typically the MAC address), and/or another address of the access point such as the IP address. In one embodiment, a mobile agent executing on a known mobile unit hears an access point by receiving a beacon frame from the access point. The mobile agent reports the MAC address of the access point to the network monitor. The mobile agent may report the information directly to the network monitor, or store the information identifying the access point until the monitor queries the mobile agent using a protocol such as SNMP to retrieve the information from the mobile unit.

The network monitor determines whether the received access point identification information corresponds to a known and/or authorized access point 220. If the received access point identification is known or authorized, the network monitor returns to step 210 to receive the next access point identification (the system also periodically attempts to verify that known but unauthorized access points are not connected to the network). If the received access point identification is neither known nor authorized, the monitor attempts to determine whether the unknown access point is a rogue access point connected to the network in step 230. The monitor preferably uses the MAC address of the access point reported by the mobile unit to issue a Reverse Address Resolution Protocol (RARP) request to identify corresponding IP address of the rogue access point. Reception of a response from the unknown access point verifies that the unknown access point is a rogue access point that is connected to the network.

Some access points, particularly inexpensive access points, do not support RARP, making their connection to the wired portion of the network more difficult to determine. In one preferred embodiment, a MAC-address-to-vendor-information table is queried by the network monitor to determine whether the access point identified by the received information supports RARP or another network method by which the presence of the access point on the wired portion of the WLAN may be determined. Based on the results of the query, the network monitor may use RARP or some other method for verifying the presence of the rogue access point on the wired portion of the WLAN. Alternatively, the network monitor may query interface tables of one or more switches on the subnet to determine if the address of the unknown access point is present.

Once the rogue access point has been verified, the monitor preferably automatically notifies the network operator or enterprise network manager of the existence of a rogue access point on the network in step 240. Notification may be accomplished via email, traps, SNMP, or other methods known to one of skill in the art.

The network monitor may also attempt to disable communications between the network and the rogue access point from the network in step 250. In one embodiment, the monitor changes the MAC address filter settings on the rogue access point to exclude all MAC addresses, effectively preventing the use on the rogue access point on the network. In another embodiment, the monitor changes the routing table settings of network devices such as routers or switches to prevent network traffic to and from the rogue access point and thereby minimize the risk to the network. The network monitor may also attempt to disable the radio of rogue access point, or to reset the rogue access point to factory default settings that are more easily managed. Other techniques, such as an echo attack, or sending connection close or reset TCP/IP messages to rogue wireless devices may alternatively be used to disable communications.

If the network monitor can verify that the access point for which identification information has been received is not connected to the wired portion of the network, the network monitor preferably updates a table comprising information of known access points that are not on the wired portion of the network. Such access points may be, for example, connected to unrelated wired networks in nearby locations. If the MAC address of an access point maps to vendor information indicating that the access point supports RARP or another protocol through which the access point could reliably be discovered on the wired portion of the network, and the network monitor tries but fails to verify that the access point is on the wired portion of the network using the reliable protocol, the network monitor may store information that the access point is not on the wired portion of the network. This technique may not work in cases where the MAC address of the access point has been forged. Moreover, some access points may be configured so that it may not be possible to reliably verify that the access point is not connected to the wired portion of the network.

In one preferred embodiment, the network monitor monitors the network for spoofing by checking switch interface tables for MAC addresses that appear on more than one port. If the same MAC address appears on two different ports of a switch, then one of the MAC addresses is a rogue device.

Figure 3:
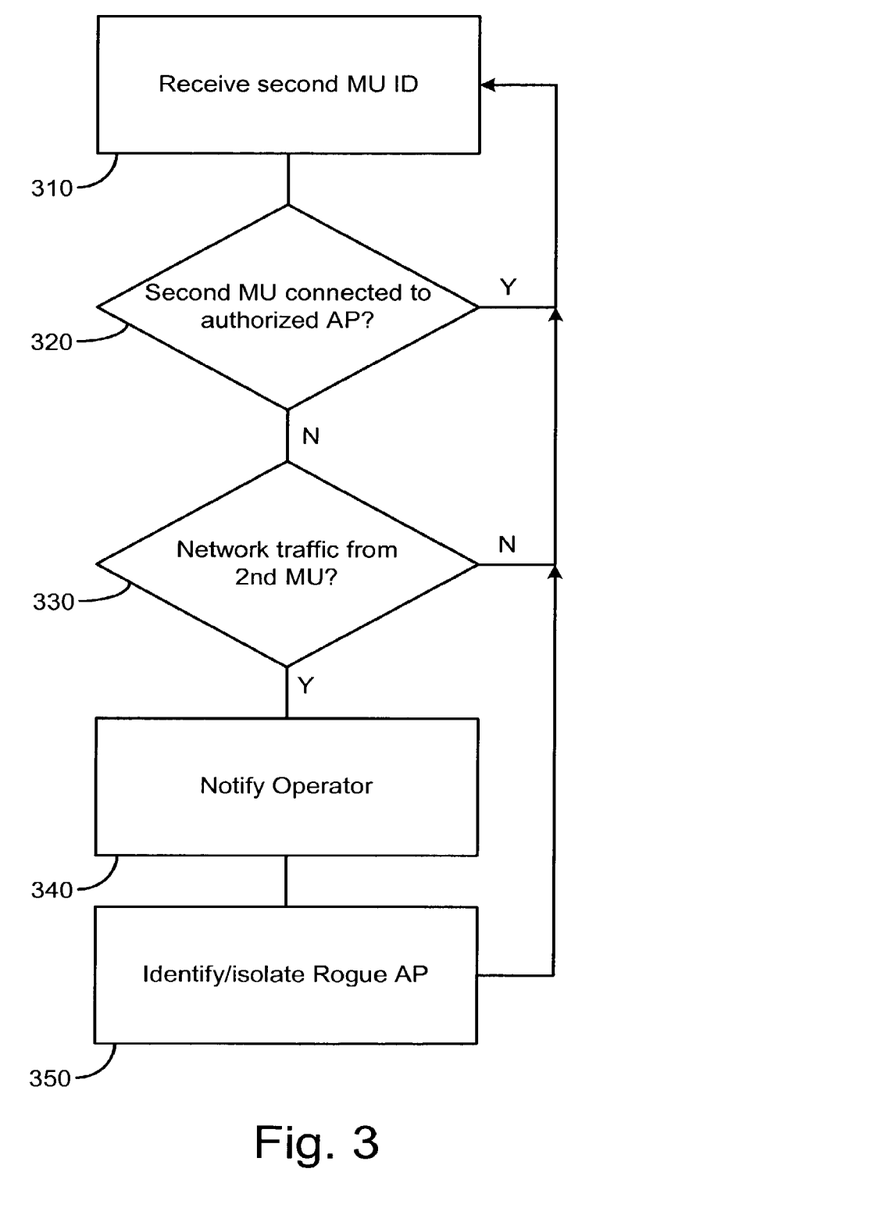
FIG. 3 is a flowchart of another embodiment of the present invention.

FIG. 3 is a flowchart of another embodiment of the present invention. The network monitor receives mobile unit identification in step 310. The network monitor determines whether the reported mobile unit is connected to the network in step 320. The network monitor maintains a list of currently connected mobile units or may query the association tables of each of the authorized access points on the network. The monitor checks the MAC address of the reported mobile unit and checks if the reported mobile unit is included in the currently connected mobile unit list. If the reported mobile unit is included in the currently connected mobile unit list, the reported mobile unit is an authorized mobile unit associated with an authorized access point and the monitor returns to step 310 to receive the next mobile unit identification.

In one preferred embodiment, the mobile unit is reported by a mobile agent executing on a known mobile unit. The wireless network interface of the known mobile unit on which the mobile agent executes is configured to operate promiscuously, passing all received wireless packets to the mobile agent. The mobile agent may then monitor all wireless traffic within its operating range. When (preferably only the first time, or periodically) the agent hears traffic to or from another mobile unit, the mobile agent reports to the network monitor identification information of the other mobile unit, preferably the MAC address or other network address information of the other mobile unit. Alternatively, the mobile agent stores the information received from the other mobile unit until the monitor queries the mobile agent to retrieve the information from the mobile unit. Preferably, the mobile agent maintains a table of reported wireless devices, and reports only changes to the table, to reduce the number of times wireless devices are reported.

In one preferred embodiment, the network monitor is capable of monitoring network traffic on the wired portion of the WLAN and if the reported mobile unit is not part of the currently connected mobile unit list, the network monitor searches for traffic on the wired network from the reported mobile unit in step 330, preferably by looking for the MAC address of the mobile unit on the wired portion of the WLAN. If the monitor detects network traffic from the reported mobile unit but the reported mobile unit is not part of the currently connected mobile unit list, the mobile unit must be associated with a rogue access point. The network monitor then automatically notifies the network operator or enterprise network manager of the existence of a rogue access point on the network in step 340.

Notification may be accomplished via email, traps, SNMP, or other methods known to one of skill in the art.

The network monitor also preferably attempts to identify the rogue access point in step 350. The monitor preferably issues a Reverse Address Resolution Protocol (RARP) request to identify the corresponding IP address of the rogue access point. Other methods may also be used. If the rogue access point responds to the RARP request, the network monitor may also attempt to isolate the rogue access point from the network in step 250. In one embodiment, the monitor changes the MAC filter settings on the rogue access point to exclude all MAC addresses, effectively preventing the use on the rogue access point on the network. In another embodiment, the monitor changes the MAC filter table settings of network devices such as routers or switches to prevent network traffic to and from the rogue access point and minimize the risk to the network. In another embodiment, the monitor determines a port on a switch or router to which the access point is connected and disables the port.

Figure 4:
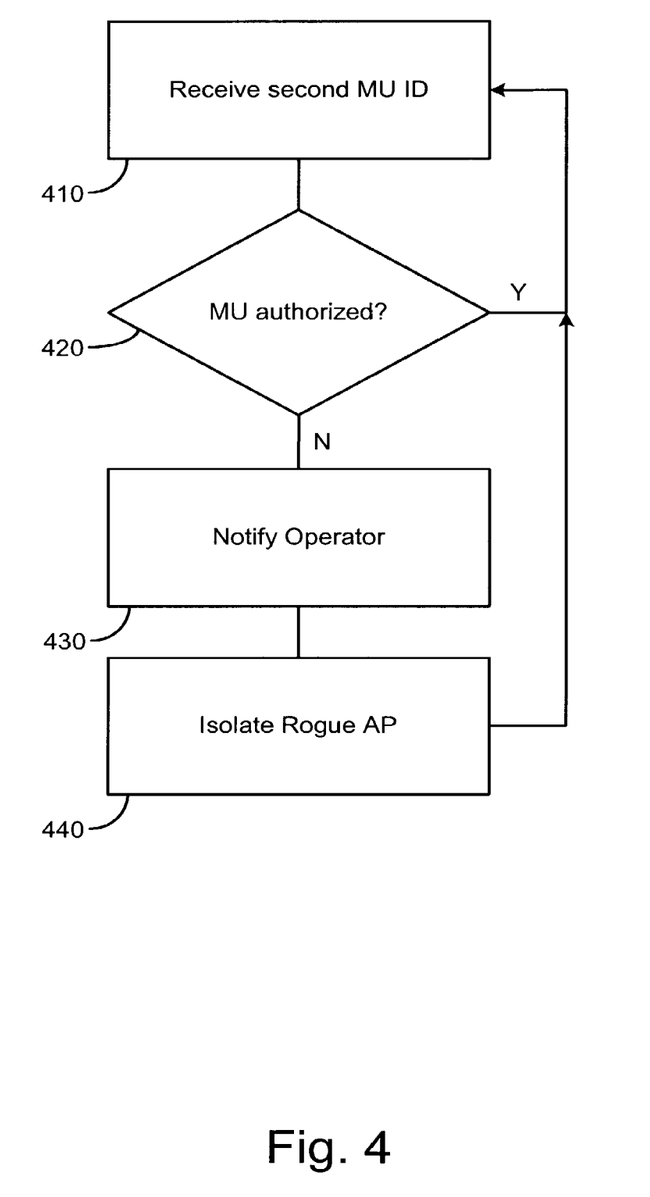
FIG. 4 is a flowchart of another embodiment of the present invention.

FIG. 4 is a flowchart of another embodiment of the present invention. The network monitor receives mobile unit identification in step 410. In step 420, the monitor checks a list of authorized mobile unit to determine whether the reported mobile unit is an authorized mobile unit. If the reported mobile unit is an authorized mobile unit, the monitor returns to step 410 to receive another mobile unit identification. If the reported mobile unit is not an authorized mobile unit, the monitor notifies the network operator or enterprise network manager of the existence of a rogue mobile unit in step 430.

The network monitor may also attempt to isolate the rogue mobile unit from the network in step 440. In one embodiment, the monitor changes the MAC filter settings on the authorized network access points to disallow association with the rogue mobile unit, thereby preventing the rogue mobile unit from connecting to the network. In another embodiment, the monitor changes the routing configuration of network devices such as routers or switches to minimize the risk to the network by disallowing the MAC or IP address of the rogue mobile unit.

Figure 5:
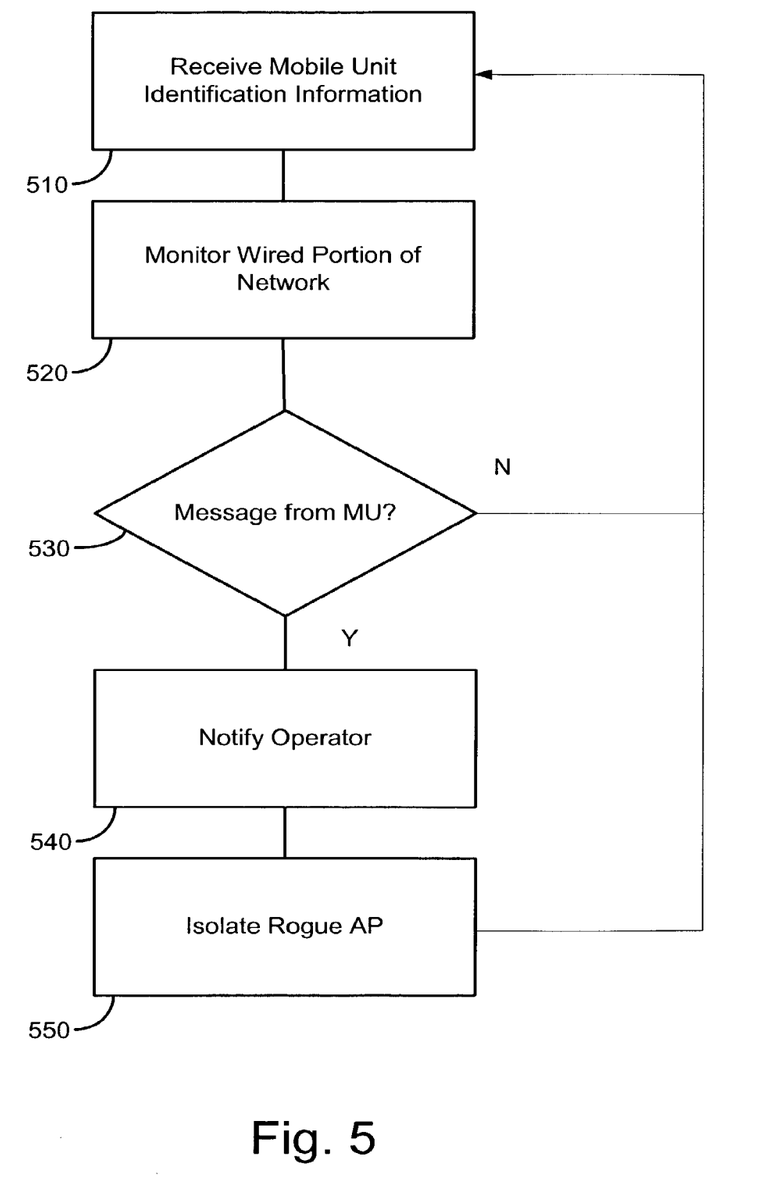
FIG. 5 is a flowchart of another embodiment of the present invention.

FIG. 5 is a flowchart of another embodiment of the present invention directed to network segments intended to have no wireless access. Network monitor receives mobile unit identification information from a wireless receiver in step 510. The wireless receiver may comprise a special wireless device configured to be unable to transmit, but to receive wireless traffic, in which case the wireless receiver may be connected to the network segment. Alternatively, the wireless receiver may comprise an access point connected to a wired portion of a wireless network that is not a part of the network segment intended to have no wireless access. Preferably, the access point cell includes at least a portion of the physical location of the network segment intended to have no wireless access. The wireless receiver may, in another alternative, comprise a mobile unit that communicates with an access point connected to a wired portion of a wireless network that is not a part of the network segment intended to have no wireless access. Note that the methods described above using conventional wireless devices capable of sending and receiving wireless signals may also be used to monitor network segments intended to have no wireless access, if a network having wireless access is within wireless range of the network intended to have no wireless access.

Preferably, mobile unit identification information comprises a MAC address of a mobile unit. In step 520, the network monitor monitors the network traffic and in step 530, network monitor compares the network traffic with mobile unit identification information received in step 510. If the network traffic does not include network traffic from the mobile unit, then the mobile unit is not connected to the network segment, and the network monitor awaits the receipt of the next mobile unit identification information. If the network traffic includes traffic from the mobile unit (for example, if the MAC address of the mobile unit appears on the network segment), then there must exist a rogue access point on the network segment, and the network monitor notifies the operator 540. Preferably the MAC address of the access point with which the mobile unit is associated is reported by the wireless receiver, and the monitor attempts to identify the rogue access point in step 540 by using the reported MAC address to transmit RARP requests or other methods. If the rogue access point is identified the network monitor preferably attempts to isolate or disable network communications with the rogue access point as described above.

In another aspect of the invention, the network monitor is preferably configured to periodically disable wireless communications on the network, preventing all wireless communications, according to a defined business schedule. For example, if business hours at a particular location are 8 a.m. to 6 p.m. Monday through Friday, the network monitor is preferably configured to disable wireless communications at the location between 6 p.m. and 8 a.m. Monday through Friday, and all weekend. Wireless communications are preferably disabled by modifying MAC filter tables in access points connected to the network and/or modifying switch interface tables to prevent switching of packets to and from the access points. Other methods for disabling wireless communications may be used.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. A system for detecting an access point, comprising:
   a network segment for which no access point is authorized; and
   a network monitor that (a) receives mobile unit identification information from a wireless receiver and (b) receives network traffic from the network segment, wherein the network monitor detectors an unauthorized access point by comparing the network traffic from the network segment with the mobile unit identification information, wherein when the network traffic from the network segment includes the mobile unit identification information it is determined that an unauthorized access point is on the network segment because no access point is authorized on the network segment, wherein the wireless receiver receives the mobile unit identification information from a mobile wireless device.

2. The system of claim 1, wherein when the unauthorized access point is detected, the network monitor isolates network communication with the unauthorized access point.

3. The system of claim 1, wherein when the unauthorized access point is detected, the unauthorized access point is reported to a network operator.

4. The system of claim 1, wherein the mobile unit identification information comprises a media access control (MAC) address of the mobile wireless device.

5. The system of claim 1, wherein the wireless receiver is located on the network segment, and wherein the wireless receiver is configured to receive wireless network traffic but not to transmit wireless network traffic.

6. The system of claim 1, wherein the wireless receiver is not located on the network segment, but is located elsewhere on the network.

7. The system of claim 1, wherein the wireless receiver is configured to receive wireless network traffic, and wherein the wireless receiver is unable to transmit wireless network traffic.

8. A method for detecting an access point, comprising:
   receiving mobile unit identification information from a wireless receiver; and
   monitoring network traffic on a network segment for which no access point is authorized, wherein an unauthorized access point is detected by comparing the network traffic from the network segment with the mobile unit identification information, wherein when the network traffic from the network segment includes the mobile unit identification information it is determined that an unauthorized access point is on the network segment because no access point is authorized on the network segment, wherein the wireless receiver receives the mobile unit identification information from a mobile wireless device.

9. The method of claim 8, wherein when the unauthorized access point is detected, network communication with the unauthorized access point is isolated.

10. The method of claim 8, wherein when the unauthorized access point is detected, the unauthorized access point is reported to a network operator.

11. The method of claim 8, wherein the mobile unit identification information comprises a media access control (MAC) address of the mobile wireless device.

12. The method of claim 8, wherein the wireless receiver is located on the network segment, and wherein the wireless receiver is configured to receive wireless network traffic but not to transmit wireless network traffic.

13. The method of claim 8, wherein the wireless receiver is not located on the network segment, but is located elsewhere on the network.

14. The method of claim 8, wherein the wireless receiver is configured to receive wireless network traffic, and wherein the wireless receiver is unable to transmit wireless network traffic.

* * * * *

UNITED STATES PATENT AND TRADEMARK OFFICE
CERTIFICATE OF CORRECTION

PATENT NO. : 8,787,576 B2
APPLICATION NO. : 13/164459
DATED : July 22, 2014
INVENTOR(S) : Whelan et al.

It is certified that error appears in the above-identified patent and that said Letters Patent is hereby corrected as shown below:

IN THE CLAIMS:

In column 10, line 14 please delete "detectors" and replace it with --detects--.

Signed and Sealed this
Tenth Day of February, 2015

Michelle K. Lee
*Deputy Director of the United States Patent and Trademark Office*